Figure 7:
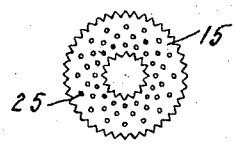

Jan. 14, 1930.  J. MUROS  1,743,793
HEADLIGHT
Original Filed Dec. 7, 1927  2 Sheets-Sheet 1
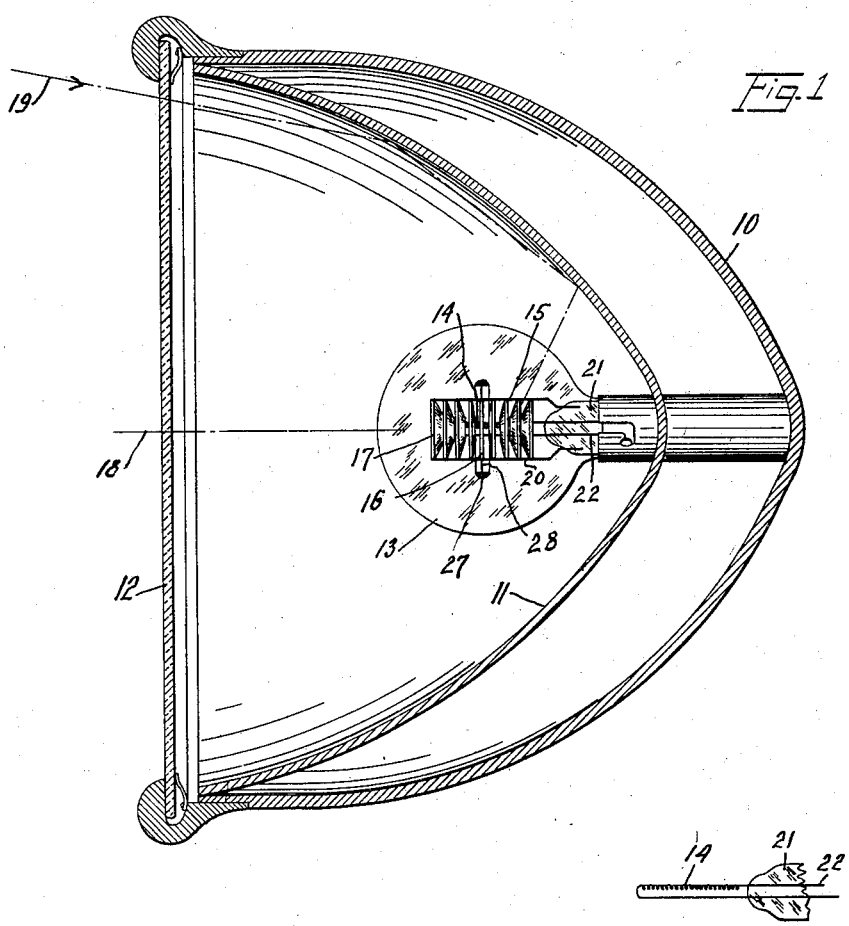
Fig.1
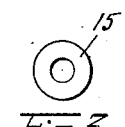
Fig.3
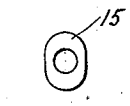
Fig.5
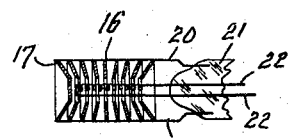
Fig.2
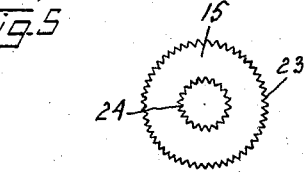
Fig.4
Fig.6
INVENTOR
J. Muros
BY
ATTORNEY Jan. 14, 1930.  J. MUROS  1,743,793
HEADLIGHT
Original Filed Dec. 7, 1927  2 Sheets-Sheet 2

INVENTOR
J. Muros
BY
Sigmund Herzog
ATTORNEY

Patented Jan. 14, 1930

1,743,793

UNITED STATES PATENT OFFICE

JOSEPH MUROS, OF NEW YORK, N. Y., ASSIGNOR OF ONE-HALF TO FREDERICK E. PERRY, OF NEW YORK, N. Y.

HEADLIGHT

Application filed December 7, 1927, Serial No. 238,287. Renewed June 5, 1929.

The present invention relates to improvements in headlights, commonly employed on motor vehicles. The invention pertains more particularly to an anti-glare attachment for headlights.

In the most common type of headlights heretofore in use parabolic reflectors are employed, and the headlights are so mounted upon the motor vehicles that their optical axes are tilted so as to cause the light to be projected in a beam downwardly in front of the vehicle. This arrangement, however, does not eliminate the objectionable glare incident to the use of ordinary headlights. Persons facing an advancing car, as for instance those driving another vehicle or pedestrians in the roadway, are subject to a strong glare from the reflectors irrespective of the fact as to whether the optical axes of the headlights are tilted, as above mentioned, or not. It has been proposed heretofore to employ devices for dimming the headlights. In one type of these devices dimming vanes or shutters are used, but these not only obstruct to a large degree the passage of the light rays from the headlight, but are ineffective when the vehicle, on which they are mounted, travels on an incline. Again, in another type light obstructing means is used around the incandescent lamp, forming part of the headlight, and this means, while it effectively shuts off the direct light rays emanating from the light source, does in no way dim the reflected light, that is to say the light rays emanating from the reflector of the headlight. In other types light diffusing means are employed, but these unduly disperse the light.

The main object of the present invention is to provide a headlight for motor vehicles with means which permits the light to be projected toward the surface of the ground in front of the vehicle in an unobstructed manner and which at the same time eliminates the objectionable blinding glare by dimming both the direct and reflected rays, or in other words to provide an anti-glare attachment for headlights which is entirely free from the objections above stated.

Another object of the invention is to provide a construction of the type mentioned which is simple in construction, efficient in operation and capable of manufacture on a commercial scale, or, in other words, one which is not so difficult to produce as to be beyond the reasonable cost of such a contrivance.

A further object of the invention is to provide an anti-glare attachment which is adapted to be used in connection with headlight bodies of any suitable construction, and is capable of being mounted thereon without making any changes whatever in the construction thereof.

With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims, without departing from the spirit or sacrificing any of the advantages of the invention.

A few of the many possible embodiments of the invention are illustrated in the accompanying drawings, in which:—

Figure 8:
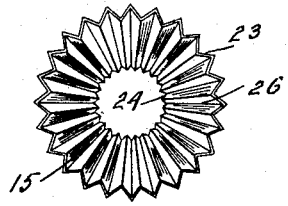
Figure 9:
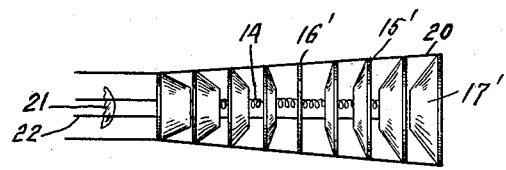
Figure 10:
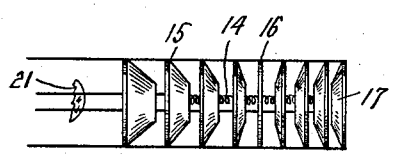

Figure 1 is a central vertical section taken through a headlight constructed in accordance with the present invention; Fig. 2 is a side elevation of the filament of the incandescent lamp used in the headlight; Fig. 3 is a front elevation of the anti-glare attachment of the lamp; Fig. 4 is a vertical section taken through the anti-glare attachment, showing the same in relation to the lamp filament; and Fig. 5 is a view similar to that shown in Fig. 3 of a modification of the invention; Figs. 6 to 8, inclusive, are similar views of further modifications; and Figs. 9 and 10 are sections taken through still further modifications.

Generally speaking, the invention consists in applying interiorly of the incandescent lamp and around its filament a shutter which, while it distributes the light rays emanating from the filament over the entire area of the reflecting means and effectively prevents the direct rays of light from producing a glare in or affect the eyes of the observer, it does not decrease the illuminating power of the lamp, nor do the reflected rays of light cause a glare in the eyes of the observer, provided the eyes are not in the optical axis of the reflector of the headlight.

Referring now first to Figs. 1 to 4, inclusive, of the drawings, the numeral 10 indicates a headlight housing, which may be of any suitable material and construction, it being provided interiorly with a reflector 11, preferably parabolic, although this is not essential. In front of the reflector is mounted in the housing a glass plate 12, which may be either plain or in the form of a light dispersing lens, if required. A lamp 13, preferably an incandescent electric lamp, is mounted within the headlight, having a filament 14, preferably in the form of a spiral of substantial length, the same being arranged in or in parallel relation to the optical axis of the reflector. If arranged in parallel relation to the optical axis of the reflector, the filament should be as close as possible to the said optical axis. If a parabolic reflector is employed, the filament is mounted so that its center of illumination should be in the focus of the reflector. The light shutter is disposed within the lamp and around the said filament. It comprises a plurality of perforated disks 15 which are arranged in spaced relation in vertical planes at right angles to the axis of the filament, the said filament extending through the said disks. These disks are located throughout the length of the filament and are divided by a central disk 16 into two groups. The central disk is flat, as clearly shown in Figs. 1 and 4 of the drawings, while the remaining disks are in the form of hollow frusta of cones, those in front of the flat disk 16 having their bases nearer to the outer end of the filament and those in rear of the disk 16 having their bases nearer to the inner end of the filament. In other words, the disks, with the exception of the central disk 16, are cup-shaped and the mouths of each group are disposed further away from the central disk than their perforated central portions. Attention is, however, called to the fact that the outermost cup, denoted by the numeral 17, is imperforate and is disposed in front of the filament, as shown in Fig. 4 of the drawings.

Having now reference again to Fig. 4 of the drawings, it appears that the several frusta of cones of each group increase gradually in height from the one nearest the central disk to the one farthest away therefrom, or in other words those nearer the central disk are shallower than those farther away therefrom. The several disks may be made of any suitable opaque or translucent material, and their surfaces are light non-reflecting. They may be of any suitable color, although it is preferred, if translucent, to color them green.

The bulb of the lamp may obviously be of any suitable configuration, although globular or tubular shapes are preferred.

In use, the headlight is mounted on the vehicle with its optical axis 18 slightly tilted. If a parabolic reflector is used, all rays are reflected in parallel relation to the optical axis of the reflector, so that the rays emanating from the headlight are all thrown downwardly to the surface of the ground in front of the vehicle. The outermost disk, denoted by the numeral 17, acts as a screen, intercepting the direct rays of light. In other words, it prevents the direct rays from reaching the eyes of the observer. The remaining disks, on the other hand, distribute the direct rays of light over the entire area of the reflector owing to their different inclination and to their opposed relation to the central disk 16. In practice it has been found that, when the light is not in operation, that is to say when it is not lit, a plurality of thin concentric circles appear in the reflector to the observer whose eyes are in the optical axis of the reflector. These concentric circles are obviously images of the edges of the disks of the shutter. If the light is lit and the eyes of the observer are still located in the optical axis of the reflector, these images disappear and the entire area of the reflector is lit by the evenly distributed light. As soon as the eyes of the observer are outside of the optical axis of the reflector, the above-mentioned images reappear but increase in thickness as the distance between the optical axis and the eyes of the observer increase. When the distance amounts to several feet, the reflector appears to be dark or practically dark to the eyes of the observer. It appears at least as dark as to prevent production of glare in the eyes. From this it will be seen that, inasmuch as the driver of an approaching automobile always has his eyes materially above the optical axis of the headlight of the oncoming car, the shutter described herein will prevent any portion of the reflector from producing a glare in the eyes of the driver. Attention is also called to the fact that at any time that the observer's eye is outside of the optical axis of the reflector, for instance if the line of vision be that indicated by the numeral 19 in Fig. 1 of the drawings, one or the other of the shutter disks intercepts the said line, so that the viewer cannot see the image of nor the actual filament of the lamp. This may be another reason why the reflector appears practically dark to an observer, when the latter's eyes are outside of the optical axis of the reflector.

As stated above, the shutter disks, if made of translucent material are, preferably, colored green. Translucent shutter disks do not cut off completely the direct rays of light, but the green color softens the light without unduly dispersing the same. As appears from Figs. 2 and 4 of the drawings, the filament of the incandescent lamp is of substantial length. The purpose of this arrangement is to obtain a better distribution of the light emanating therefrom on the light reflecting surface, that is to say on the reflector 11. This distribution, however, is increased by the disks 15, in a manner above described.

The light shutter disks are supported in proper relation to the filament by two wires 20, preferably fastened to the element 21 through which the lead-in wires 22 of the lamp filament are extended. It is possible, however, to make the disks of one integral piece in the form of a spiral, the convolutions of which must obviously be divided into two groups in the same manner as the disks above referred to and their pitch must increase from the innermost disk to the outermost disk of each group.

The modification illustrated in Fig. 5 differs from the one above described only in that the disks are of oblong or elliptic shape. This results in a different distribution of the direct rays of light onto the reflector. Otherwise the operation of the elements are the same as of that described in connection with Figs. 1 to 4, inclusive, of the drawings.

The modification illustrated in Fig. 6 of the drawings differs from those above described only in that both the outer and inner edges of the shutter disks are serrated, as indicated at 23 and 24, respectively. Due to this construction the light emanating from the filament of the lamp is more evenly diffused on the reflector of the lamp, that is to say no marked contrasts appear on the reflector.

It appears that when serrated disks are employed and the eye of the observer is in the optical axis of the reflector, the reflector is lit and, as the eye moves away from the said axis, a gradual dimming effect is obtained, the images of the edges of the disks merging one into another.

The modification illustrated in Fig. 7 differs from the one shown in Fig. 6 in that the shutter elements are provided with small openings 25. The openings are in alignment in the several shutter elements and extend parallel to the longitudinal axis of the filament of the lamp. For this reason more direct rays of the light emanating from the filament are thrown forward, but these direct rays are not visible if the eyes of the observer are not in the optical axis of the reflector of the headlight.

The modification illustrated in Fig. 8 differs from the one described in Fig. 6 only in that the shutter cups are corrugated longitudinally, as clearly shown at 26. These corrugations greatly add to the diffusing properties of the serrations 23 and 24 at the outer and inner edges of the said cups.

Referring now to the modification illustrated in Fig. 9, it will be observed that the construction and location of the shutter elements 15′, 16′ and 17′ correspond to those of the elements 15, 16 and 17 of the construction shown in Fig. 1 of the drawings. However, the elements 15′, 16′ and 17′ are not of equal diameters but these diameters gradually decrease from the outermost unperforated cup 17′ to that nearest the base of the lamp. Experiments have shown that when a headlight is provided with the construction illustrated in Fig. 9 of the drawings, the same conditions prevail, when the eyes of the observer are located in the optical axis of the reflector, as described in connection with Fig. 1 of the drawings, but the reflector is darkened more suddenly when the eyes of the observer move away from the optical axis of the reflector.

In the modification illustrated in Fig. 10 of the drawings, the shutter cups and disk are all of the same diameter, but they are not placed equidistantly, as described in connection with Fig. 1 of the drawings. On the contrary, the distance between the same gradually increases from the outermost unperforated cup 17 to the cup which is nearest to the element 21 of the lamp. With this construction the same result is obtained as with the device described in connection with Fig. 9 of the drawings.

As shown in Fig. 1 of the drawings, a ring 27 of transparent material may be placed around the central disk 16. The inner diameter of this ring is substantially larger than the outer diameter of the said disk, the said ring being spaced from said disk by spider arms 28 of any suitable material. This ring is concentrically disposed in relation to the said disk and may have any suitable color, preferably green. In cross-section the said ring is, preferably, plano-convex, its plane surface facing the perimeter of the disk. The purpose of the said ring is to refract the rays of light emanating from the lamp filament to the surface of the reflector with the result that the reflected rays of light issuing from the reflector are colored. This ring is, obviously, necessary only when the shutter disks are made of opaque material. It is preferable to dull the inner plane surface of the transparent ring, while its outer surface may be polished. By dulling the said inner surface, the light rays passing through the ring are diffused.

What I claim is:—

1. The combination with an incandescent lamp, of a plurality of spaced shutter elements disposed within said lamp in fixed relation to one another and to the filament of said lamp, the filament extending through said shutter elements save through the outermost one which is disposed in front of the filament.

2. The combination with an incandescent lamp having a filament of substantial length, a plurality of spaced shutter elements disposed within said lamp in fixed relation to one another and to the filament of said lamp, said shutter elements being disposed in planes at right angles to the longitudinal axis of said filament and the latter extending through said shutter elements save through the outermost one which is disposed in front of the filament.

3. The combination with an incandescent lamp having a filament of substantial length, of a plurality of shutter elements disposed within said lamp in fixed relation to one another and to the filament of said lamp, said shutter elements including a plurality of perforated cups and a perforated disk disposed in spaced relation, said filament extending through the perforations of said cups and disk, said disk dividing said cups into two groups, the mouths of one group facing the base of the lamp and those of the other group facing in opposite direction.

4. In a combination according to claim 3, the cup elements of each group having different depths and their depths increasing as their distance from said disk increases.

5. The combination with an incandescent lamp having a filament of substantial length, a plurality of shutter elements disposed within said lamp in fixed relation to one another and to the filament of said lamp, said shutter elements including a plurality of hollow frusta of cones and a perforated disk disposed in spaced relation, said filament extending through said frusta of cones and said disks, said disk dividing said frusta of cones into two groups, the bases of one group facing the base of the lamp and those of the other group facing in opposite direction.

6. In a combination according to claim 5, the several frusta of cones of each group increasing gradually in height from the one nearest said disk to the one farthest away therefrom.

7. In a combination according to claim 5, the generatrices of the frusta of cones of each group increasing in acuteness to their axes as the distance of said frusta of cones increase from said disk.

8. In a combination according to claim 5, the generatrices of the frusta of cones of each group increasing in acuteness to their axes as the distance of said frusta of cones increases from said disk, and the heights of the frusta of cones of each group also increasing as their distance increases from said disk.

9. In a combination according to claim 3, said disk and cups being provided with serrations at their outer edges.

10. In a combination according to claim 3, said disk and said cups being provided with serrations both at their outer edges and around said perforations.

11. In a combination according to claim 5, said disk being provided with serrations at its outer edge and said frusta of cones at their bases.

12. In a combination according to claim 5, said disk being provided with serrations at its outer edge and around its perforation and said frusta of cones being provided with serrations at their bases and at their tops.

13. In a combination according to claim 5, said frusta of cones being provided with serrations at their bases and at their tops and having longitudinal corrugations extending from said bases to said tops.

14. In a combination according to claim 5, said frusta of cones being provided with longitudinal corrugations extending from their bases to their tops.

15. In a combination according to claim 3, said cups and disk gradually decreasing in size from the outermost element to that adjacent the base of the lamp.

16. In a combination according to claim 5, said frusta of cones and disk gradually decreasing in size from the outermost element to that adjacent the base of the lamp.

17. In a combination according to claim 3, the distance between said cups and disk gradually increasing from the outermost element to that adjacent the base of said lamp.

18. In a combination according to claim 5, the distance between said frusta of cones and disk gradually increasing from the outermost element to that adjacent the base of said lamp.

19. A combination according to claim 3, comprising a transparent colored ring placed in spaced relation around said disk.

Signed at New York, in the county of New York, and State of New York, this 16th day of November, A. D. 1927.

JOSEPH MUROS.